United States Patent
Smith

(10) Patent No.: US 12,158,393 B2
(45) Date of Patent: Dec. 3, 2024

(54) INTERNAL LEAK DETECTOR

(71) Applicant: European Space Agency, Paris (FR)

(72) Inventor: Matthew Smith, AG Noordwijk ZH (NL)

(73) Assignee: European Space Agency, Paris (FR)

( * ) Notice: Subject to any disclaimer, the term of this patent is extended or adjusted under 35 U.S.C. 154(b) by 228 days.

(21) Appl. No.: 17/792,954

(22) PCT Filed: Jan. 22, 2021

(86) PCT No.: PCT/EP2021/051415
§ 371 (c)(1),
(2) Date: Jul. 14, 2022

(87) PCT Pub. No.: WO2021/148584
PCT Pub. Date: Jul. 29, 2021

(65) Prior Publication Data
US 2023/0049836 A1  Feb. 16, 2023

(30) Foreign Application Priority Data

Jan. 22, 2020 (EP) ..................................... 20153115

(51) Int. Cl.
*G01M 3/02* (2006.01)
*G01M 3/00* (2006.01)
(Continued)

(52) U.S. Cl.
CPC ............ *G01M 3/025* (2013.01); *G01M 3/002* (2013.01); *G01M 3/165* (2013.01); *G01M 3/184* (2013.01)

(58) Field of Classification Search
CPC .................................................. G01M 3/165
See application file for complete search history.

(56) References Cited

U.S. PATENT DOCUMENTS 3,874,222 A * 4/1975 Ladd ....................... G01M 3/18
374/4
10,634,579 B1 * 4/2020 Woodbury ............ G01M 3/165
(Continued)

FOREIGN PATENT DOCUMENTS

CN         107264269 A    10/2017
WO      2019/105854 A1    6/2019

OTHER PUBLICATIONS

Patent Cooperation Treaty, Notification of the International Search Report and the Written Opinion of the International Searching Authority, or the Declaration, Application No. PCT/EP2021/051415, dated Apr. 26, 2021, in 64 pages.
(Continued)

*Primary Examiner* — Patrick Assouad
*Assistant Examiner* — Mark A Shabman
(74) *Attorney, Agent, or Firm* — Procopio, Cory, Hargreaves & Savitch LLP

(57) ABSTRACT

This application relates to a leak detector device (100) for detecting an internal leak in a fluid path. The leak detector comprises a housing (110) with a flow passage (120) extending through the housing (110), one or more pairs of temperature sensors (130, 140) for detecting a temperature difference between an outside of the housing (110) and the flow passage (120), one temperature sensor of each pair being arranged towards an outer surface of the housing (110) and the other temperature sensor of the pair being arranged towards an inner surface of the housing (110) that faces the flow passage (120), and an array of electrically conductive wires (150, 160) that extend across the flow passage (120). The array of electrically conductive wires (150, 160) comprises one or more positive polarity wires and one or more negative polarity wires. The application further relates to a corresponding method of leak detection.

18 Claims, 4 Drawing Sheets

(51) Int. Cl.
*G01M 3/16* (2006.01)
*G01M 3/18* (2006.01)

(56) References Cited

U.S. PATENT DOCUMENTS

| | | | |
|---|---|---|---|
| 2014/0266744 A1* | 9/2014 | Lyon | G01M 3/165 |
| | | | 340/605 |
| 2016/0281704 A1* | 9/2016 | Lyon | F04B 49/065 |
| 2018/0080847 A1 | 3/2018 | Hansen et al. | |
| 2019/0086285 A1* | 3/2019 | Yoshino | G01M 3/16 |
| 2019/0339152 A1* | 11/2019 | Hazzard | G01M 3/188 |
| 2019/0354121 A1* | 11/2019 | Lyon | G05D 7/0635 |
| 2020/0348202 A1 | 11/2020 | Farkas | H05K 1/162 |
| 2021/0262887 A1* | 8/2021 | Okazaki | G01M 3/165 |
| 2022/0065726 A1* | 3/2022 | McNab | G01M 3/18 |

OTHER PUBLICATIONS

Patent Cooperation Treaty, Extended European Search Report, Application No. EP 20153115.9, dated Aug. 3, 2020, in 27 pages.

* cited by examiner

INTERNAL LEAK DETECTOR

CROSS-REFERENCE TO RELATED APPLICATIONS

This application is US National Stage of International Patent Application PCT/EP2021/051415, filed Jan. 22, 2021, which claims benefit of priority from European Patent Application EP20153115.9, filed Jan. 22, 2020, the contents of both of which are incorporated herein by reference.

TECHNICAL FIELD

This application relates to internal leak detectors for fluid paths. In particular, the application relates to internal leak detectors for rocket engines of space vehicles. The application further relates to corresponding methods of internal leak detection.

BACKGROUND

Internal leak detection is an important issue in a number of different technical fields, including, but not limited to, rocket engines of space vehicles. Rocket engine leakage anomalies have occurred on multiple space programs during ground testing and on orbit. Engine leakage is typically classified as a critical or catastrophic hazard due to the toxicity, corrosivity, and energy potential of the propellants. Detecting leakage thus is an important task. However, leak detection capability to date, especially leak detection for space applications such as rocket engines, has only limited effectiveness.

Thus, there is a need for improved techniques for leak detection in fluid paths. There is particular need for such techniques that are applicable to space vehicles, e.g., to their rocket engines.

SUMMARY

In view of some or all of these needs, the present disclosure proposes a leak detector device and a method of performing leak detection, having the features of the respective independent claims.

An aspect of the disclosure relates to a leak detector device for detecting an internal leak in a fluid path. It is understood that leakage detection may only be relevant (or may only be performed) if there is no intended fluid flow through the fluid path. The leak detector device may include a housing with a flow passage extending through the housing. The housing may be insertable into the fluid path of, for example, a pipe or pipe assembly in general, or a rocket engine for a space vehicle in particular. The leak detector device may further include one or more pairs of temperature sensors for detecting a temperature difference between an outside of the housing and the flow passage.

One temperature sensor of each pair may be arranged towards an outer surface of the housing and the other temperature sensor of the pair may be arranged towards an inner surface of the housing that faces the flow passage. The temperature sensors of each pair may be arranged opposite to each other, with a wall portion of the housing interposed between them. The leak detector device may further include an array of electrically conductive wires that extend across the flow passage. The array of electrically conductive wires may include one or more positive polarity wires (i.e., wires that have positive polarity) and one or more negative polarity wires (i.e., wires that have negative, polarity, e.g., are grounded). The array of electrically conductive wires may include a first subset (e.g., plurality) of positive polarity wires and a second subset (e.g., plurality) of negative polarity wires.

The combined measurement of conductivity and temperature (or temperature differences) used by the leak detector device provides for reliable leak detection and helps to avoid false positive indications of leakage. Moreover, the proposed combination of two leak detection approaches in a single sensor device allows for detection of liquid leakage and leakage of liquid that flash evaporates due to exposure to low pressure (e.g., space vacuum). The proposed leak detector device is compact enough to be readily applicable to space use cases including efficient internal leak detection for rocket engines of space vehicles. For this purpose, it can be integrated into the rocket engine flow control valve just downstream of the seal and thereby enable immediate detection of leakage during the mission. Overall, the proposed leak detector device may aid improving operation safety (e.g., mission safety) and reliability of fault detection.

In some embodiments, the pairs of temperature sensors may be further adapted to detect a temperature change in the flow passage. For example, leak detection may involve observing that there is a drop in the temperature inside the flow passage (e.g., as detected by the inner surface sensors) and further observing that the temperature outside the flow passage (e.g., as detected by the outer surface sensors) drops by less and/or later. By verifying leak detection through observing temperature drops (expected to result from flash evaporation) and further observing a predefined time development of the temperature difference(s), false positive leak detection can be more reliably avoided.

In some embodiments, the electrically conductive wires may be arranged such that one or more pairs of wires of opposite polarity are formed. The wires of each pair may be spaced apart by a distance that allows for an electric connection between these wires to be formed by fluid droplets that stream along the flow passage.

In some embodiments, the electrically conductive wires may be arranged so that an electric circuit is closed when fluid droplets that stream along the flow passage contact a pair of adjacent wires of opposite polarity. That is, the wires may be spaced apart such that pairs of adjacent wires can be electrically connected by fluid droplets that stream along the flow passage.

In some embodiments, the electrically conductive wires may be arranged so that each positive polarity wire is spaced apart from one of the negative polarity wires by no more than a predetermined maximum distance for at least one position along the respective positive polarity wire. Thereby, it can be ensured that fluid droplets propagating along the flow passage can be detected anywhere across the flow passage.

In some embodiments, the electrically conductive wires may be arranged substantially in parallel to each other.

In some embodiments, the electrically conductive wires may be arranged in a common plane that intersects the flow passage. Then, adjacent ones of the electrically conductive wires in the common plane may have opposite polarity. Alternatively, the positive polarity wires may be arranged in a common first plane that intersects the flow passage and the negative polarity wires may be arranged in a common second plane that intersects the flow passage. The first and second planes may extend in parallel to each other but may be displaced (e.g., offset) from each other, for example in a direction extending along the longitudinal direction of the flow passage. This offset may be sufficiently small to ensure that electric circuits are formed by liquid droplets flowing along the flow passage.

In some embodiments, the positive polarity wires may be electrically insulated from the housing. By contrast, the negative polarity wires may be electrically connected to the housing. The housing may be electrically conducting.

In some embodiments, respective insulators for electrically insulating the positive polarity wires from the housing may be made (e.g., formed, manufactured) from one of ceramics, quartz, or Teflon. These materials have been found to be resistant to contact by certain propellants used for rocket engines.

In some embodiments, the positive polarity wires may be electrically connected to each other via an electrical connection. The electrical connection may be provided inside of (e.g., within) the housing or outside of the housing. The electrical connection may be insulated from the housing.

In some embodiments, the electrically conductive wires may be made (e.g., formed, manufactured) from a titanium alloy or stainless steel. These materials have been found to be resistant to contact by propellants used for rocket engines.

In some embodiments, the leak detector device may further include readout circuitry for detecting a current flowing between one or more of the positive polarity wires and one or more of the negative polarity wires of the array of electrically conductive wires and for detecting one or more temperature differences from the pairs of temperature sensors. The readout circuitry may be further adapted to determine whether an internal leak is present in the fluid path based on the detected current and the detected one or more temperature differences. The readout circuitry may implement an algorithm for determining whether a leak is present, based on the aforementioned information and predefined criteria. In one implementation, one temperature difference per pair of temperature sensors may be detected. Alternatively, one overall difference may be detected for all temperature sensors, for example by determining an average temperature for the temperature sensors of each pair that are arranged towards the outer surface of the housing, determining an average temperature for the temperature sensors of each pair that are arranged towards the inner surface of the housing that faces the flow passage, and taking the difference of these average temperatures.

In some embodiments, the readout circuitry may be further adapted to determine whether an internal leak is present in the fluid path based on the detected temperature change in the flow passage.

Another aspect of the disclosure relates to an assembly of a pipe for conducting a fluid and a valve arranged within the pipe, further including the leak detector device according to the above aspect or any of its embodiments. Therein, the leak detector device may be arranged downstream of the valve, with respect to a flow direction of the fluid through the valve when the valve is in an open state. For instance, the leak detector device may be arranged immediately downstream of the valve. In some implementations, the assembly may be part of a rocket engine of a space vehicle.

Another aspect of the disclosure relates to a rocket engine including the leak detector device.

Yet another aspect of the disclosure relates to a method of performing leak detection using a leak detector device for detecting an internal leak in a fluid path. The leak detector device may include a housing with a flow passage extending through the housing. The leak detector device may further include one or more pairs of temperature sensors for detecting a temperature difference between an outside of the housing and the flow passage. One temperature sensor of each pair may be arranged towards an outer surface of the housing and the other temperature sensor of the pair may be arranged towards an inner surface of the housing that faces the flow passage. The leak detector device may further include an array of electrically conductive wires that extend across the flow passage. The array of electrically conductive wires may include one or more positive polarity wires and one or more negative polarity wires. The method may include detecting a current flowing between one or more of the positive polarity wires and one or more of the negative polarity wires of the array of electrically conductive wires. The method may further include detecting one or more temperature differences from the pairs of temperature sensors. The method may yet further include determining whether an internal leak is present in the fluid path based on the detected current and the detected one or more temperature differences. The determining step may be further based on one or more predefined criteria.

In some embodiments, the method may further include further detecting a temperature change in the flow passage. Then, determining whether an internal leak is present in the fluid path may further depend on the detected temperature change in the flow passage.

It will be appreciated that apparatus features and method steps may be interchanged in many ways. In particular, the details of the disclosed apparatus (e.g., leak detector device) can be realized by the corresponding method of operating the apparatus, and vice versa, as the skilled person will appreciate. Moreover, any of the above statements made with respect to the apparatus are understood to likewise apply to the corresponding method, and vice versa.

BRIEF DESCRIPTION OF THE FIGURES

Example embodiments of the disclosure are explained below with reference to the accompanying drawings, wherein FIG. 1 schematically illustrates an example of a leak detector device according to embodiments of the disclosure.

DETAILED DESCRIPTION

Figure 1:
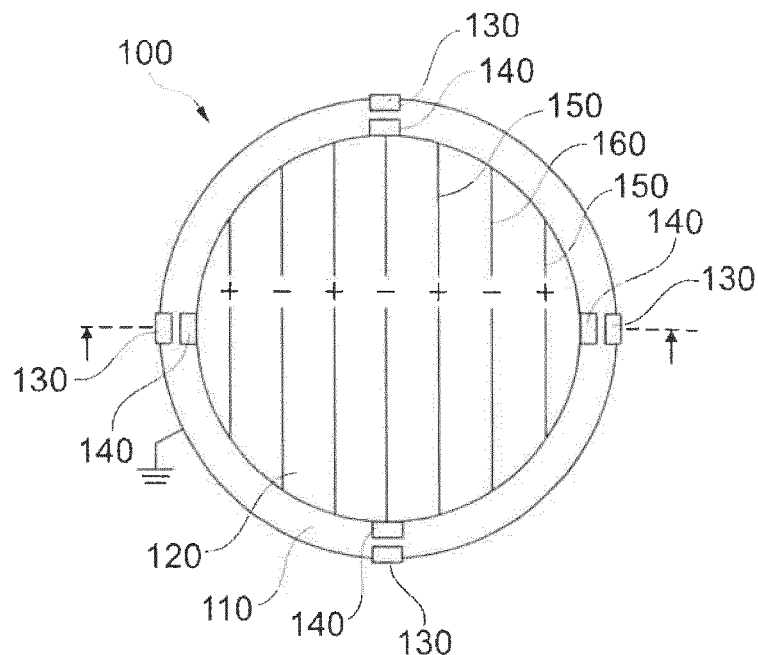

In the following, example embodiments of the disclosure will be described with reference to the appended figures. Identical elements in the figures may be indicated by identical reference numbers, and repeated description thereof may be omitted for reasons of conciseness.

Two main approaches are feasible for leak detection, such as rocket engine leak detection: pressure decay and propellant evaporation temperature measurement. In the pressure decay approach, a drop in propellant pressure due to leakage is measured using feed line pressure transducers. This is only possible when stable pressure can be expected (e.g., when the rocket engine is not firing and temperature is stable for an extended duration). Small to moderate leaks are difficult to detect due to system temperature variation and low pressure transducer fidelity. It is also difficult to isolate the leakage to a given engine or even a group of engines with this approach. Propellant evaporation temperature measurement has been used especially for manned space vehicles. This approach measures the drop in temperature associated with flash evaporation of leaked propellant in vacuum. On the downside, MMH fuel has a lower tendency than MON oxidizer to flash evaporate due to lower vapor pressure. Further, temperature sensors would typically be mounted on the exterior of the fluid structure and thus provide limited fidelity, and external environments (e.g., sun exposure) can interfere with temperature measurement.

The present invention relates to leakage detection, and especially to leakage detection for space vehicle rocket engines. It synergistically combines two detection approaches in a single purpose-built sensor device to address the shortcomings of the aforementioned approaches.

Broadly speaking, the present invention combines the following two methods incorporated into a (small) sensor device to detect and signal leakage: electrodes that are bridged by leaking fluid (e.g., propellant) completing an electrical circuit, and thermal sensors (temperature sensors) that detect a temperature drop due to flash evaporation of fluid (e.g., propellant).

As such, the present invention relates to devices and methods that combine two approaches to detect internal leakage (e.g., rocket engine leakage): electrical conductivity and temperature measurement. A sensor device according to embodiments of the disclosure includes electrical conducting wires that are extended across the flow path (e.g., propellant flow path), such that leaking fluid droplets (e.g., propellant droplets) contact two or more wires and complete an electrical circuit, allowing flow of current. Insulators may be provided around the conductive wires to electrically isolate the wires from the sensor device housing. The flowing current signals leakage and may prompt, for example, engine isolation and recovery. The sensor device also includes temperature sensors positioned on/near the internal surface and on/near the external surface. The internal sensors can detect a drop in temperature associated with flash evaporation of leaking fluid (e.g., propellant). This signals leakage and may prompt, for example, engine isolation and recovery. The materials chosen for the leak detection sensor device are preferably compatible with rocket engine propellants and space vehicle environments. In general, the leak detection sensor device is preferably compatible with space vehicle environments.

In the above, the positioning of multiple temperature sensors near/on the internal surface of the sensor device (i.e., near the flow path) allows for detection of temperature shifts very near the source. The positioning of multiple temperature sensors near/on the external surface of the sensor device allows for measurement of external sources of temperature shift. An algorithm may be established to compare internal and external temperatures (e.g., by monitoring differences between internal and external temperatures) and define conditions indicative of leakage. The comparison of internal and external temperatures may for example complement observation of temperature drops in the flow path.

The above configuration allows to achieve a leak detection sensor device that is compact and can be positioned immediately downstream of, for example, a flow control valve seal or can be readily integrated into the flow control valve.

Figure 2:
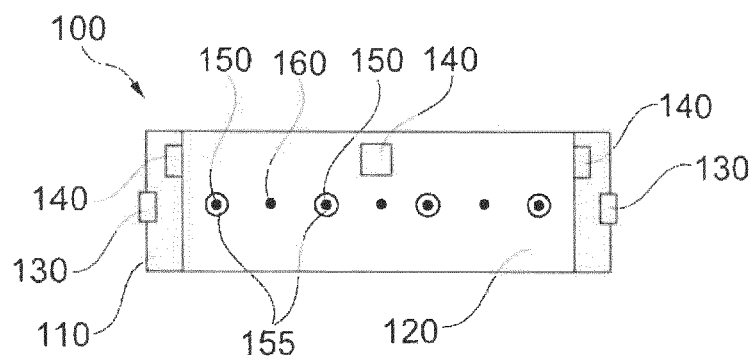
FIG. 2 is a sectional drawing of the leak detector device shown in FIG. 1, FIG. 3 and FIG. 4 schematically illustrate possible placement options for leak detector devices in space vehicle rocket engines according to embodiments of the disclosure, and FIG. 5 schematically illustrates an example of a method of leak detection according to embodiments of the disclosure.

Examples of leak detector devices according to embodiments of the disclosure will now be described with reference to FIG. 1 and FIG. 2. Therein, FIG. 1 schematically illustrates a view of an example of a leak detector device 100 according to embodiments of the disclosure when seen along a flow path through the leak detector device 100. FIG. 2 is a sectional drawing of the leak detector device 100, with the section indicated by the dashed line in FIG. 1.

The leak detector device 100 is understood to be capable of detecting an internal leak in a fluid path. This is understood to be relevant only in situations in which no fluid flow through the fluid path is expected, for example if a valve intended for blocking the fluid path is closed. To be able to detect the internal leak, the leak detector device 100 may be insertable into the fluid path. For example, the leak detector device may be suitable for positioning at the outlet of a flow control valve (FCV) of a rocket engine.

The leak detector device 100 comprises a housing 110 that may have, for example, an annular shape with an inner cylindrical segment forming a flow passage 120 that extends through the housing. However, the shape of the housing 110 is not limited to annular, and the shape of the flow passage is not limited to cylindrical. In general, it is sufficient that the housing 110 defines a flow passage 120 that extends through the housing 110. The leak detector device may be deployed by inserting the leak detector device (i.e., the flow passage 120) into a fluid path for which internal leak detection is to be performed, such as for example a ,propellant flow path of a rocket engine. The housing 110 may be electrically conducting.

As noted above, embodiments of the present disclosure relate to a leak detection sensor device and a process for detecting and signaling leakage. Two detection approaches are integrated into a single leak detector device: electrical conductivity and temperature measurement. For using electrical conductivity for leak detection, the leak detector device 100 comprises (an array of) electrically conductive wires 150, 160 that extend across the flow passage 120. The electrically conductive wires comprise one or more positive polarity wires 150 and one or more negative polarity wires 160. The positive polarity wires 150 may be wires to which a voltage above ground is applied, and the negative polarity wires 160 may be wires that are grounded. Grounding may be achieved, for example, by electrically connecting the negative polarity wires 160 to the (electrically conducting) housing 110. In some embodiments, outer surfaces of the housing may be insulated, especially those outer surfaces that come in contact with interfacing components of, for example, the rocket engine. Thereby, it can be avoided that stray currents would run through the rocket engine.

The positive polarity wires 150 may be electrically insulated from the housing 110. This may be achieved by insulators 155 that may be provided, for example, in respective lead-throughs in the housing 110 for the positive polarity wires 150. In general, the positive polarity wires 150 are understood to be jointly kept at a first voltage level that is above a second voltage level at which the negative polarity wires 160 are jointly kept.

The positive polarity wires 150 may be electrically connected to each other, wherein the electrical connection may be provided inside (within) or outside of the housing. In any case, it is understood that the electrical connection is electrically insulated from the housing 110 if the housing 110 is electrically conducting.

In such a configuration, liquid droplets (e.g., liquid propellant droplets) that contacting two or more wires (of opposite polarity) complete an electrical circuit, allowing generation of a signal that indicates leakage. To this end, the electrically conductive wires 150, 160 extending across the flow passage 120 may be spaced (e.g., tightly spaced) to ensure that all droplets passing through any portion of the flow passage 120 will be detected. For example, the electrically conductive wires 150, 160 can be arranged such that one or more pairs of wires of opposite polarity are formed and that the wires of each pair are spaced apart by a distance that allows for an electric connection between these wires to be formed by fluid droplets that stream along the flow passage 120. Put differently, the electrically conductive wires 150, 160 can be arranged so that an electric circuit is closed when fluid droplets that stream along the flow passage 120 contact a pair of adjacent wires of opposite polarity. To ensure that all droplets passing through any portion of the flow passage 120 will be detected, the electrically conductive wires 150, 160 may be arranged so that each positive polarity wire 150 is spaced apart from one of the negative polarity wires 160 by no more than a predetermined maximum distance (e.g., for at least one position along the respective positive polarity wire 150).

In one implementation, the electrically conductive wires 150, 160 are arranged substantially in parallel to each other. In particular, the electrically conductive wires 150, 160 may be arranged in a common plane that intersects the flow passage 120. Then, adjacent ones of the electrically conductive wires 150, 160 in the common plane may have opposite polarity. In one example, the electrically conductive wires 150, 160 may be substantially evenly spaced in the common plane. In another implementation, the positive polarity wires 150 may be arranged in parallel to each other in a first common plane and the negative polarity wires 160 may be arranged in parallel to each other in a second common plane. The first and second common planes may be parallel to each other and offset from each other along a direction of flow in the flow passage 120. In such a configuration, the extending direction of the positive polarity wires 150 and the extending direction of the negative polarity wires 160 do not need to coincide with each other. For example, these extending directions may be orthogonal to each other.

The material chosen for the electrically conductive wires is preferably compatible with rocket engine propellants and space vehicle environments. For example, the electrically conductive wires may be manufactured from a titanium alloy or from stainless steel. Likewise, the material chosen for the insulators 155 preferably is preferably compatible with rocket engine propellants and space vehicle environments. For example, the insulators 155 may be manufactured from one of ceramics, quartz, or Teflon.

To enable leak detection, the electrically conductive wires 150, 160 are connected to readout circuitry 170 (e.g., space vehicle electronics, such as a failure detection, isolation, and recovery (FDIR) system). When the circuit is completed by a conductive liquid droplet (e.g., propellant droplet), a current flows between respective positive and negative polarity wires. The readout circuitry 170 may receive an indication 174 of the current between the electrically conductive wires. In some implementations, the readout circuitry may receive plural such indications, for example relating to different pairs of positive and negative polarity wires. A current flowing between the electrically conductive wires 150, 160 may signal leakage, so that the indication 174 received by the readout circuitry 170 may be used for determining whether an internal leak is present. As such, the readout circuitry 170 can detect a current flowing between one or more of the positive polarity wires 150 and one or more of the negative polarity wires 160 of the (array of) electrically conductive wires 150, 160. It can further determine whether an internal leak is present in the fluid path based on the detected current. If it is detected that a current flows between the electrically conductive wire, it can be concluded that liquid droplets are moving along the flow passage 120, which indicates liquid leakage. If an internal leak is determined to be present, a leak detection signal 176 may be output by the readout circuitry 170. As will be described in more detail below, the determination can further depend on one or more detected temperatures (or changes over time thereof) and/or temperature differences between internal temperatures and external temperatures (or changes over time thereof).

As noted above, the leak detector device 100 additionally uses temperature measurement for internal leak detection. To this end, the leak detector device 100 comprises one or more pairs of temperature sensors 130, 140. One temperature sensor (e.g., an outer temperature sensor) 130 of each pair is arranged towards (e.g., on or near) an outer surface of the housing 110 and the other temperature sensor (e.g., an inner temperature sensor) 140 of the pair is arranged towards (e.g., on or near) an inner surface of the housing 110 that faces the flow passage 120. The temperature sensors 130, 140 of each pair may be arranged opposite to each other, with a wall portion of the housing 110 interposed between them. In this configuration, the temperature sensors may be used for detecting a temperature (or temperature change) inside of the flow passage 120 (e.g., via the inner temperature sensors 140), but also for detecting respective temperature differences (or changes thereof) between an outside of the housing 110 and the flow passage 120 (e.g., between an external temperature and an internal temperature with respect to the flow passage 120).

For example, the pairs of temperature sensors can be used to measure drops in temperature inside the flow passage 120, which may be associated with fluid (e.g., propellant) flash evaporation in vacuum. However, the pairs of temperature sensors further enable to differentiate between temperature drops resulting from flash evaporation and temperature drops (or changes in general) resulting from changes of external temperature. Since multiple temperature sensors are integrated into the leak detector device, on/near the internal surface and on/near the external surface of the housing 110, changes in temperature inside the flow passage 120 can be detected and compared to (changes of) the external temperature, to differentiate between an internal leak and temperature changes due to external sources. For instance, leak detection may involve observing that the temperature inside the flow passage 120 (e.g., as detected by the inner temperature sensors 140) features a drop and further observing that the temperature outside the flow passage 120 (e.g., as detected by the outer temperature sensors 130) drops by less and/or later.

The temperature sensors 130, 140 are connected to the readout circuitry 170 (e.g., space vehicle electronics, such as the FDIR system). The readout circuitry 170 may receive one or more indications 172 of temperature differences and/or temperatures from the pairs of temperature sensors. An algorithm may be established by the readout circuitry to flag temperatures (or changes thereof) or temperature differences (or changes thereof) that signal leakage. As such, the readout circuitry 170 can detect one or more temperature differences from the pairs of temperature sensors 130, 140. It can further determine whether an internal leak is present in the fluid path based on the detected one or more temperature differences. In some implementations, the readout circuitry 170 can determine whether an internal leak is present in the fluid path further based on a detected temperature change in the flow passage 120. If an internal leak is determined to be present, the leak detection signal 176 may be output by the readout circuitry 170.

As noted above, the readout circuitry may base its determination of whether an internal leak is present on the current flowing between the positive and negative polarity wires 150, 160 and the temperatures and/or temperature differences read out from the temperature sensors 130, 140. To this end, the readout circuitry 170 may implement an algorithm for determining whether a leak is present, based on the aforementioned information and predefined criteria. In one implementation, one temperature difference per pair of temperature sensors may be detected. Alternatively, one overall difference may be detected for all temperature sensors, for example by determining an average temperature for the temperature sensors of each pair that are arranged towards the outer surface of the housing, determining an average temperature for the temperature sensors of each pair that are arranged towards the inner surface of the housing that faces the flow passage, and taking the difference of these average temperatures. Detection of a temperature inside of the flow passage 120 dropping by more and/or earlier than a corresponding temperature outside of the housing 110 may be judged by the readout circuitry 170 as indicating a liquid leak that has evaporated. Detection of a current flowing between the positive and negative polarity wires 150, 160 may be judged by the readout circuitry 170 as indicating a liquid leak.

The combined conductivity/temperature measurement approaches used by the leak detector device 100 described in the present disclosure provide a much more reliable leak detection and avoid false positive indications of leakage. Moreover, the proposed combination of two leak detection approaches in a single sensor device allows for detection of liquid leakage and leakage of liquid that has evaporated. Further, the leak detector device 100 is readily applicable to space applications including efficient internal leak detection on arbitrary rocket engines for space vehicles. It is compact enough to be integrated into the rocket engine flow control valve just downstream of the seal and enables immediate detection of leakage during launch preparation, and later at any point in the mission. Overall, the proposed leak detector device 100 aids to improve mission safety and reliability of fault detection. Thereby, the fault can then be isolated before propagating and leading to critical or catastrophic consequences. Such consequences might include, for example, intra-manifold explosions in hypergolic bipropellant thrusters, leading to thruster breach and propulsion system ignition or damage/destruction of adjacent subsystems. Consequences might further include, for example, propellant contamination of sensitive equipment and loss of propellant.

The leak detector device 100 is suitable for insertion into a pipe for conducting a fluid (e.g., propellant), wherein the leak detector device 100 is preferably inserted downstream (e.g., immediately downstream) of a valve in the pipe. As such, the present disclosure also relates to an assembly of a pipe for conducting a fluid and a valve arranged within the pipe, wherein the assembly further comprises the leak detector device 100 described above. In this assembly, the leak detector device 100 is arranged downstream of the valve, with respect to a flow direction of the fluid through the valve when the valve is in an open state. This assembly may be part of a rocket engine for a space vehicle, for example. Accordingly, the present disclosure likewise relates to rocket engines comprising the proposed leak detector device.

Figure 3:
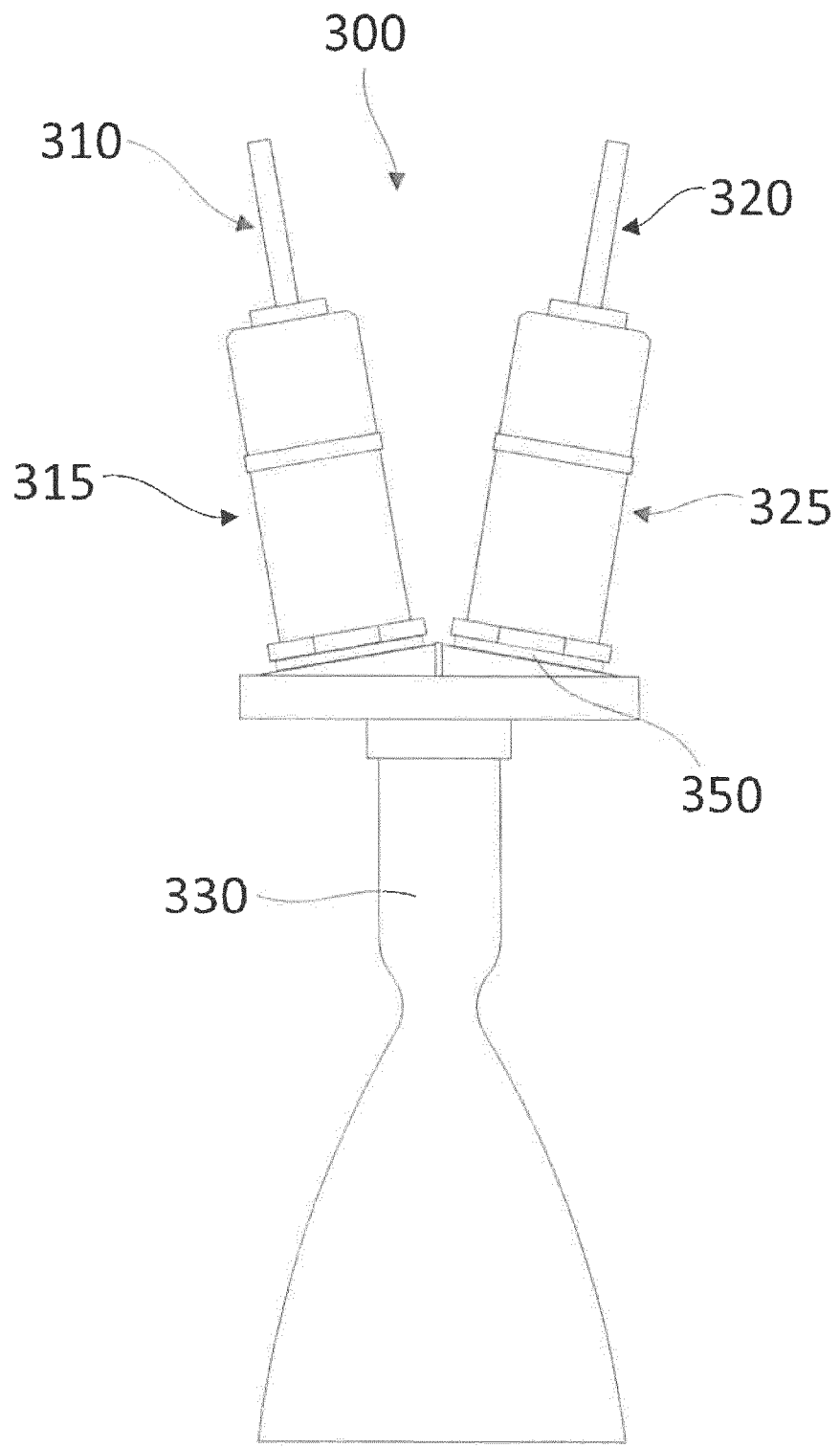
Figure 4:
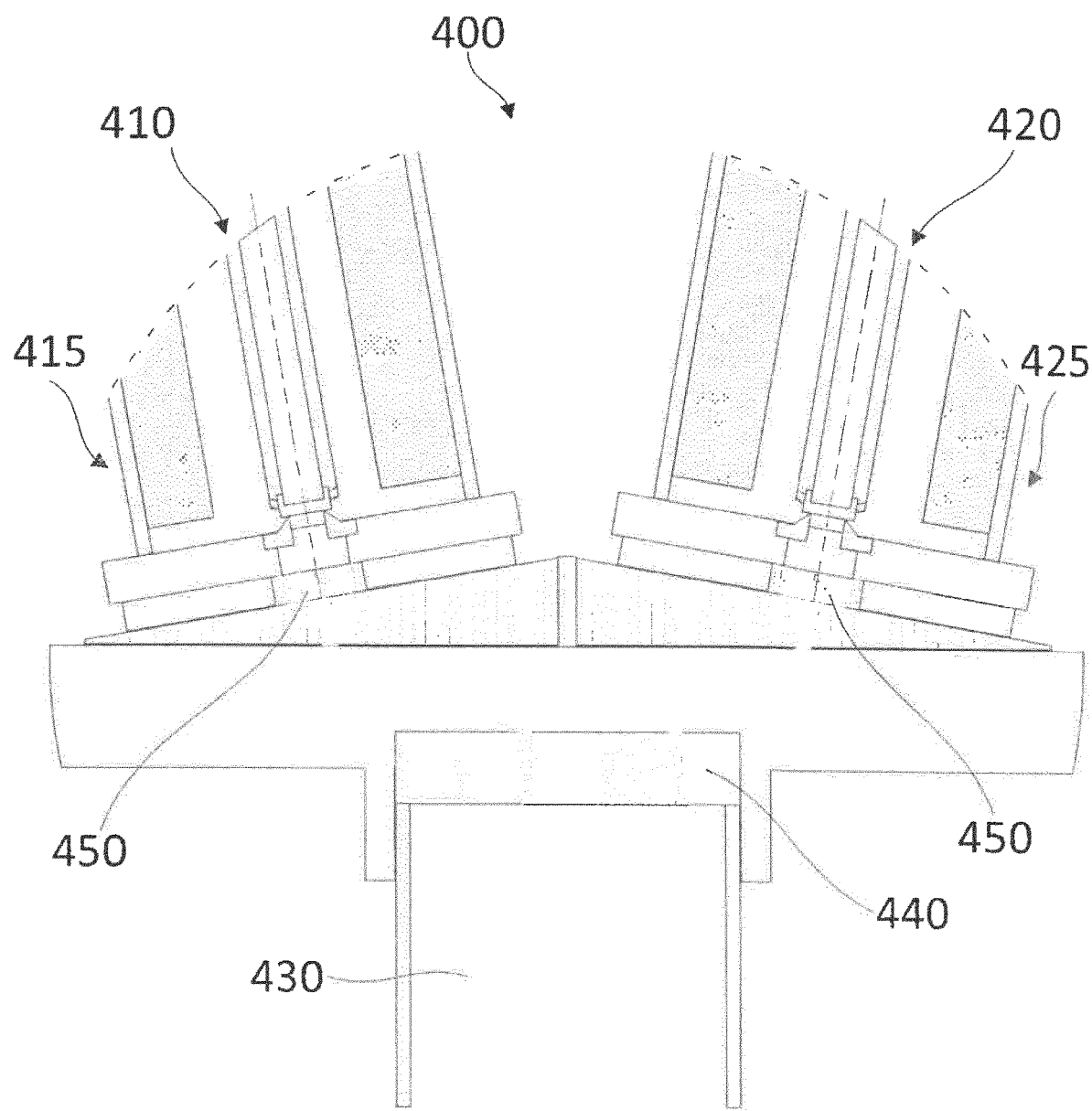

FIG. 3 and FIG. 4 illustrate possible placements of the leak detector device 100 in bipropellant rocket engines 300, 400. Bipropellant engines have two propellants, a fuel and an oxidizer. The fuel flows through the inlet tube 310, 410 the flow control valve 315, 415 (when opened), and the injector 440 into the combustion chamber 330, 430. The oxidizer has a similar path through its inlet tube 320, 420, its flow control valve 325, 425 (when opened) and the injector 440 to the combustion chamber 330, 430. One example for a feasible location 350, 450 for arranging the leak detector device is at the outlet of the flow control valve, upstream of the injector 440.

It should be noted that the apparatus features described above may correspond to respective method features (e.g., operating method features) that may not be explicitly described, for reasons of conciseness, and vice versa. The disclosure of the present document is considered to extend also to such methods and vice versa.

Figure 5:
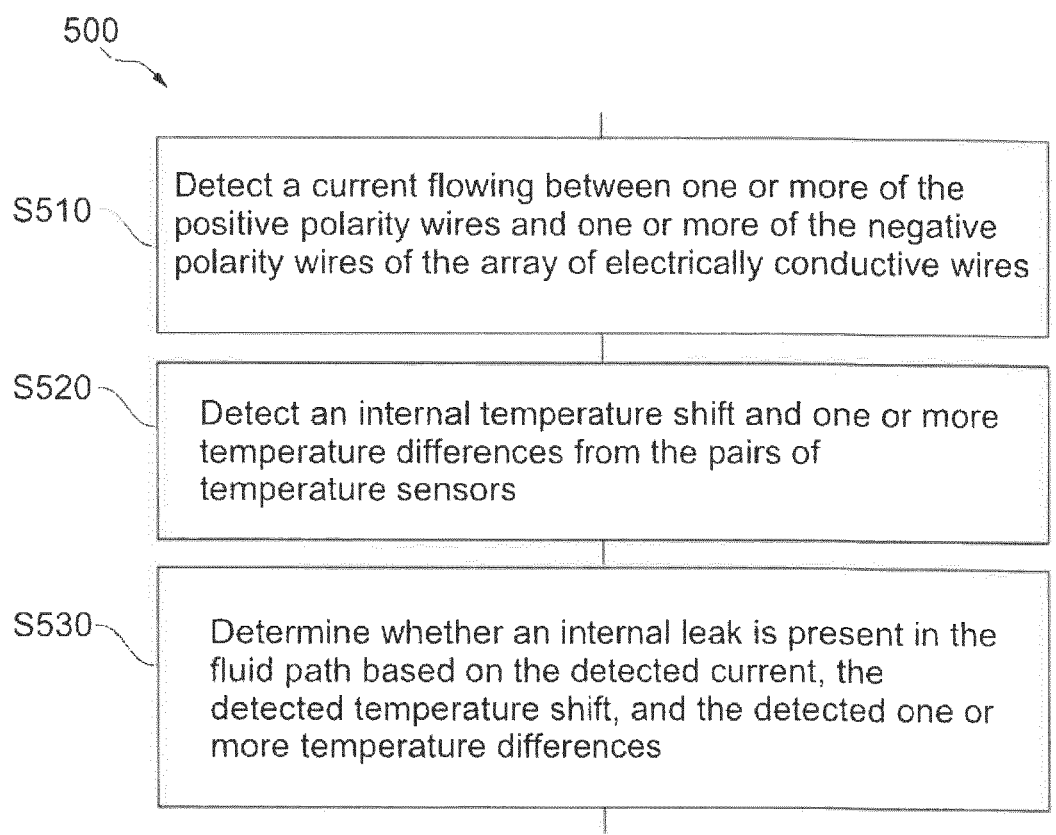

Thus, while a leak detector device in accordance with embodiments of the invention has been described above, the present disclosure likewise relates to a method of leak detection, using a leak detector device. The leak detector device used by the method is assumed to comprise, as described above, a housing with a flow passage extending through the housing, one or more pairs of temperature sensors for detecting a temperature difference between an outside of the housing and the flow passage, with one temperature sensor of each pair being arranged towards an outer surface of the housing and the other temperature sensor of the pair being arranged towards an inner surface of the housing that faces the flow passage, and an array of electrically conductive wires that extend across the flow passage, wherein the array of electrically conductive wires comprises one or more positive polarity wires and one or more negative polarity wires. The aim of this method is to detect an internal leak in a fluid path. An example of such method 500 is illustrated in FIG. 5. The method 500 comprises, at step S510, detecting a current flowing between one or more of the positive polarity wires and one or more of the negative polarity wires of the array of electrically conductive wires. At step S520, one or more temperature differences are detected from the pairs of temperature sensors. For example, individual temperature differences between temperature sensors of respective pairs of temperature sensors may be detected, or differences between temperatures respectively averaged between two or more temperature sensors may be detected at this step. This may be done in conjunction with (e.g., in response to or subsequent to) detecting an internal temperature shift within the flow passage. Such internal temperature shift may be detected by monitoring the temperatures detected by the inner surface sensors, for example. At step S530, it is determined whether an internal leak is present in the fluid path based on the detected current and the detected one or more temperature differences. In addition, this determination may be based on the detected internal temperature shift. For example, it may be determined that an internal leak is present if the detected temperature differences follow a predefined pattern and/or the current is present. As such, the determination may be based on one or more predefined criteria for the temperature differences and the current.

In some embodiments, method 500 may further comprise (not shown in FIG. 5) detecting a temperature change in the flow passage. If so, the determination of whether an internal leak is present at step S530 may further depend on the detected temperature change in the flow passage. In one example, the determination may comprise observing that the temperature inside the fluid path (as detected by the inner surface sensors) has dropped (which may be indicative of flash evaporation) and further observing that the temperature outside the fluid path (as detected by the outer surface sensors) drops by less and/or later. This finding may be complemented by the detected current, in the sense that an internal leak is determined to be present if the current is detected and/or the observed temperatures follow the aforementioned pattern.

It is understood that any circuitry, units, or blocks described above may be implemented by a computer processor or respective computer processors, or the like.

It should further be noted that the description and drawings merely illustrate the principles of the proposed method and system. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method and system. Furthermore, all statements herein providing principles, aspects, and embodiments of the invention, as well as specific examples thereof, are intended to encompass equivalents thereof.

The invention claimed is:

1. A leak detector device (100) for detecting an internal leak in a fluid path, comprising:
    a housing (110) with a flow passage (120) extending through the housing (110);
    one or more pairs of temperature sensors (130, 140) for detecting a temperature difference between an outside of the housing (110) and the flow passage (120), one temperature sensor (130) of each pair being arranged towards an outer surface of the housing (110) and another temperature sensor (140) of the pair being arranged towards an inner surface of the housing (110) that faces the flow passage (120) such that the temperature sensors of each pair are arranged opposite to each other, with a wall portion of the housing interposed between them; and
    an array of electrically conductive wires (150, 160) that extend across the flow passage (120), wherein the array of electrically conductive wires (150, 160) comprises one or more positive polarity wires (150) and one or more negative polarity wires (160).

2. The leak detector device (100) according to claim 1, wherein the pairs of temperature sensors (130, 140) are further adapted to detect a temperature change in the flow passage (120).

3. The leak detector device (100) according to claim 2, further comprising readout circuitry (170) for detecting, when a circuit is completed by a conductive fluid droplet, a current flowing between one or more of the positive polarity wires (150) and one or more of the negative polarity wires (160) of the array of electrically conductive wires (150, 160) and for detecting one or more temperature differences from the pairs of temperature sensors (130, 140),
    wherein the readout circuitry (170) is further adapted to determine whether an internal leak is present in the fluid path based on the detected current and the detected one or more temperature differences.

4. The leak detector device (100) according to claim 3, wherein the readout circuitry (170) is further adapted to determine whether an internal leak is present in the fluid path based on the detected temperature change in the flow passage (120).

5. The leak detector device (100) according to claim 1, wherein the electrically conductive wires (150, 160) are arranged such that one or more pairs of wires of opposite polarity are formed, the wires of each pair being spaced apart by a distance that allows for an electric connection between these wires to be formed by fluid droplets that stream along the flow passage (120).

6. The leak detector device (100) according to claim 1, wherein the electrically conductive wires (150, 160) are arranged so that an electric circuit is closed when fluid droplets that stream along the flow passage (120) contact a pair of adjacent wires of opposite polarity.

7. The leak detector device (100) according to claim 1, wherein the electrically conductive wires (150, 160) are arranged so that each positive polarity wire (150) is spaced apart from one of the negative polarity wires (160) by no more than a predetermined maximum distance for at least one position along the respective positive polarity wire (150).

8. The leak detector device (100) according to claim 1, wherein the electrically conductive wires (150, 160) are arranged substantially in parallel to each other.

9. The leak detector device (100) according to claim 1, wherein the electrically conductive wires (150, 160) are arranged in a common plane that intersects the flow passage (120).

10. The leak detector device (100) according to claim 9, wherein adjacent ones of the electrically conductive wires (150, 160) in the common plane have opposite polarity.

11. The leak detector device (100) according to claim 1, wherein the positive polarity wires are electrically insulated from the housing (110).

12. The leak detector device (100) according to claim 11, wherein the positive polarity wires (150) are electrically insulated from the housing (110) by insulators (155) made from one of ceramics, quartz, or Teflon.

13. The leak detector device (100) according to claim 1, wherein the positive polarity wires are electrically connected to each other via an electrical connection.

14. The leak detector device (100) according to claim 1, wherein the negative polarity wires (160) are electrically connected to the housing (110).

15. The leak detector device (100) according to claim 1, wherein the electrically conductive wires (150, 160) are made from a titanium alloy.

16. An assembly of a pipe for conducting a fluid and a valve arranged within the pipe, further comprising the leak detector device (100) according to claim 1,
    wherein the leak detector device (100) is arranged downstream of the valve, with respect to a flow direction of the fluid through the valve when the valve is in an open state.

17. A method of performing leak detection using a leak detector device (100) for detecting an internal leak in a fluid path, wherein the leak detector device (100) comprises:
    a housing (110) with a flow passage (120) extending through the housing (110);
    one or more pairs of temperature sensors (130, 140) for detecting a temperature difference between an outside of the housing (110) and the flow passage (120), one temperature sensor of each pair being arranged towards an outer surface of the housing (110) and another temperature sensor of the pair being arranged towards an inner surface of the housing (110) that faces the flow passage (120) such that the temperature sensors of each pair are arranged opposite to each other, with a wall portion of the housing interposed between them; and
    an array of electrically conductive wires (150, 160) that extend across the flow passage (120), wherein the array of electrically conductive wires (150, 160) comprises one or more positive polarity wires and one or more negative polarity wires; and wherein the method comprises:

detecting, when a circuit is completed by a conductive fluid droplet, a current flowing between one or more of the positive polarity wires and one or more of the negative polarity wires of the array of electrically conductive wires (150, 160);

detecting one or more temperature differences from the pairs of temperature sensors (130, 140); and determining whether an internal leak is present in the fluid path based on the detected current and the detected one or more temperature differences.

18. The method according to claim 17, further comprising detecting a temperature change in the flow passage (120), wherein determining whether an internal leak is present in the fluid path further depends on the detected temperature change in the flow passage (120).

* * * * *